(12) United States Patent
Farel

(10) Patent No.: US 9,407,558 B2
(45) Date of Patent: Aug. 2, 2016

(54) METHOD AND SYSTEM FOR AUTOMATIC TRIGGERING NETWORK MANAGEMENT CONTROL FOR VOIP BORDER ELEMENTS

(71) Applicant: AT&T Intellectual Property I, L.P., Atlanta, GA (US)

(72) Inventor: Richard A. Farel, Englishtown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 516 days.

(21) Appl. No.: 13/891,583

(22) Filed: May 10, 2013

(65) Prior Publication Data

US 2014/0334310 A1    Nov. 13, 2014

(51) Int. Cl.
*H04L 12/819*    (2013.01)

(52) U.S. Cl.
CPC .................................. *H04L 47/21* (2013.01)

(58) Field of Classification Search
USPC ...................................................... 370/235.1
See application file for complete search history.

(56) References Cited

U.S. PATENT DOCUMENTS

| | | | | |
|---|---|---|---|---|
| 4,408,255 | A | | 10/1983 | Adkins |
| 5,428,506 | A | | 6/1995 | Brown et al. |
| 5,436,965 | A | * | 7/1995 | Grossman ............... H04M 3/36 379/112.01 |
| 5,617,095 | A | | 4/1997 | Kim et al. |
| 5,689,275 | A | | 11/1997 | Moore et al. |
| 6,263,065 | B1 | * | 7/2001 | Durinovic-Johri .... H04M 3/323 379/265.02 |
| 6,748,063 | B1 | * | 6/2004 | Hunt .................. H04M 3/5237 379/112.01 |
| 6,781,959 | B1 | * | 8/2004 | Garakani ............. H04L 41/069 370/217 |
| 6,801,607 | B1 | * | 10/2004 | Marchand ............ H04M 15/00 379/111 |
| 6,968,441 | B1 | * | 11/2005 | Schnee ................. G06F 9/5016 711/173 |
| 7,447,159 | B1 | * | 11/2008 | Croak ..................... H04L 41/22 370/242 |
| 7,593,343 | B1 | * | 9/2009 | Croak ................... H04M 3/436 370/241 |
| 8,255,996 | B2 | * | 8/2012 | Elrod .................. H04L 63/0227 370/245 |
| 8,503,313 | B1 | * | 8/2013 | Lang ...................... H04L 65/80 370/252 |
| 2003/0086663 | A1 | | 5/2003 | Brezina et al. |
| 2004/0020674 | A1 | | 2/2004 | McFadden et al. |
| 2005/0276400 | A1 | * | 12/2005 | Morrison .............. H04M 15/00 379/114.14 |
| 2005/0281399 | A1 | * | 12/2005 | Moisey ................. H04M 15/41 379/126 |
| 2006/0218778 | A1 | | 10/2006 | Jawahan et al. |
| 2009/0059895 | A1 | * | 3/2009 | Yasrebi ............... H04L 12/5691 370/352 |
| 2010/0077598 | A1 | | 4/2010 | Hodge |
| 2010/0087191 | A1 | * | 4/2010 | Kocsis ............... H04L 63/0853 455/433 |
| 2010/0130054 | A1 | | 5/2010 | Le |
| 2010/0142514 | A1 | * | 6/2010 | Stein ...................... H04L 12/66 370/352 |
| 2011/0158395 | A1 | * | 6/2011 | Farel ..................... H04M 15/00 379/112.01 |
| 2012/0198519 | A1 | * | 8/2012 | Parla ..................... H04L 63/107 726/3 |
| 2013/0062096 | A1 | | 3/2013 | Han et al. |
| 2013/0062115 | A1 | | 3/2013 | Chang |

\* cited by examiner

*Primary Examiner* — Edan Orgad
*Assistant Examiner* — Emmanuel Maglo

(57) ABSTRACT

The present disclosure is directed to a method and system for automatic triggering network management (NM) control for Voice-Over-IP (VoIP) border elements (BE). The method detects call storm events by monitoring blocked call error messages and maintaining counts according to telephone number based control strings, and controls call storm events by limiting the admitted call rate for calls matching a control string according to an adaptive leaky bucket control. The control drain rate is updated periodically based on a calculated successful call rate and is set to somewhat exceed the successful rate. A control is automatically removed when no blocked calls are observed for a specific number of consecutive windows.

20 Claims, 15 Drawing Sheets

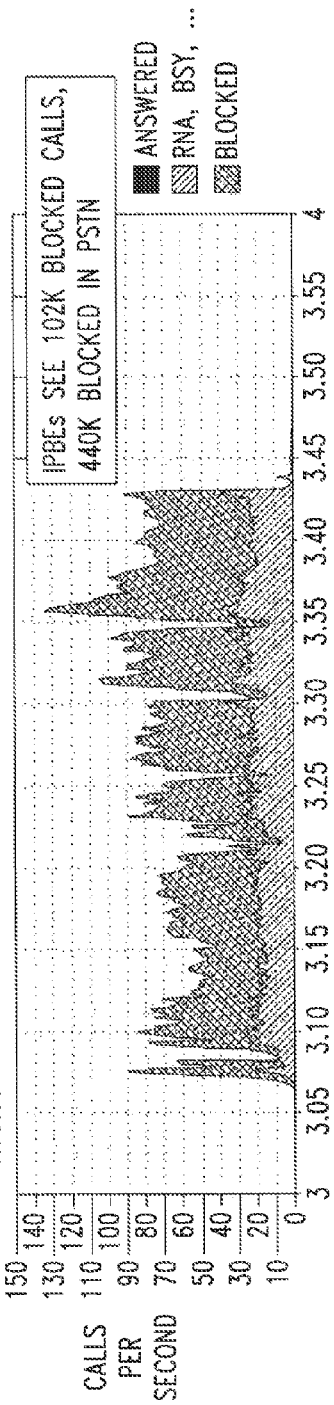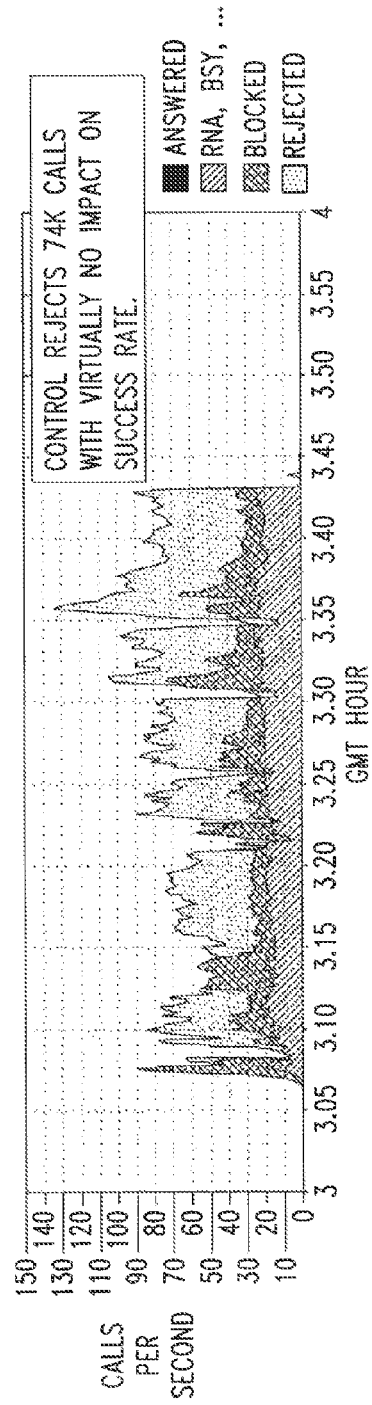
FIG. 10(A)
FIG. 10(B)

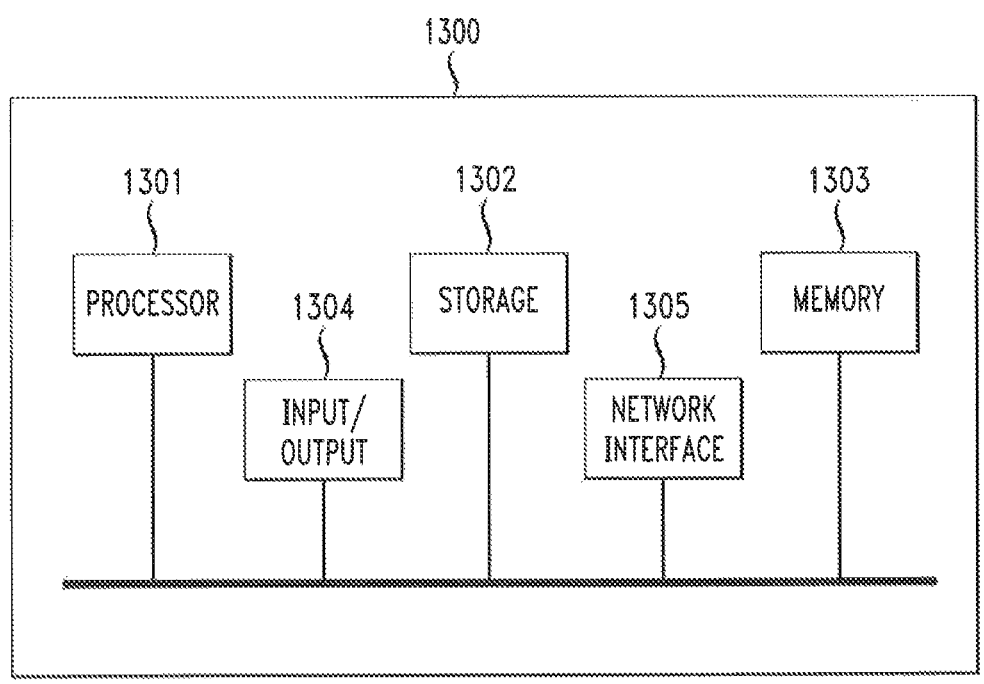

METHOD AND SYSTEM FOR AUTOMATIC TRIGGERING NETWORK MANAGEMENT CONTROL FOR VOIP BORDER ELEMENTS

BACKGROUND

Call storms in telecommunications networks can occur for a variety of reasons. Telemarketing campaigns, tele-voting, lotteries, media call-ins, natural disasters are some well known examples. Unintended call looping events and malicious denial of service attacks are others. During these call storms, an exceedingly high rate of calls to a single endpoint can be generated to cause other valid calls to be blocked. Telecom network operators rely on traffic management controls to protect their networks during call storm events. Such events are best managed by limiting storm traffic at the edge of the network. Therefore, a need exists for a method and apparatus for providing monitoring and prevention of call storms in a communications network, such as a VoIP network.

BRIEF SUMMARY

The present disclosure is directed to a method and system for automatic triggering network management (NM) control for Voice-Over-IP (VoIP) border elements (BE). In an embodiment, in response to determining that a message received by a network interface is a new invite call from an un-trusted network and that a control table is not null, a control string is extracted from the call and the control table is searched for an entry that matches the control string, a call counter is updated, a leaky bucket level is updated, and a determination is made whether the leaky bucket level exceeds a threshold and, if exceeded, the call is rejected and a counter of rejected calls is updated.

In another embodiment, the call is allowed and the leaky bucket level is updated in response to determining that the leaky bucket level does not exceed the predetermined threshold. In another embodiment, a control string is extracted from a blocked call error message and a detect table is searched for an entry that matches the control string in response to determining that the message is a blocked call error message on a trusted network. Also, a blocked call counter is updated in response to identifying an entry that matches the control string and a control flag is set in response to determining that a value of the blocked call counter level exceeds a second predetermined threshold.

In another embodiment, a network control timer is monitored and a success rate for the control table is calculated in response to determining that a value of the network control timer exceeds a predetermined time limit, where calculating the success rate includes: subtracting a number of blocked calls and a number of rejected calls from a total number of calls, updating a drain rate using an exponential smoothing in response to determining that the network management control is in an active state, updating a blocked call counter of the update control table in response to determining that a blocked call was received within the predetermined time limit, and deleting an entry from the control table in response to determining that a count of the number of consecutive control windows with no blocked calls for the entry exceeds a second predetermined threshold.

In other embodiment, the network management control is switched to an inactive state or active state by way of an administrative command.

These and other advantages of the present disclosure will be apparent to those of ordinary skill in the art by reference to the following detailed description and the accompanying drawings.

BRIEF DESCRIPTION OF THE DRAWINGS

FIGS. 10-12 illustrate a playback of events, according to an embodiment; and

FIG. 13 is a high-level block diagram of an exemplary computer that may be used to implement certain embodiments.

DETAILED DESCRIPTION

In this disclosure a novel control algorithm for managing these events in Voice over IP (VoIP) networks is described. The control runs on edge elements and detects events by monitoring blocked call error messages on the trusted network interface keeping a count for each 'control string'. A control string can be a called telephone number or number prefix (e.g., NPA-XXX or NPA) or calling number or a combination thereof. Alternatively, the control string could be a source or destination IP address or subnet (e.g. a xxx.xxx.xxx/24). Strings with counts exceeding a threshold in a set time window are entered in a control table (if not already on the table). New call attempts arriving on the un-trusted network interface that contain the control string are rate limited by an adaptive leaky bucket control at a level the network can handle without excessive blocking. This rate is determined and adjusted by measuring the successful call rate for each control string and setting to drain rate at a level somewhat above the success rate. The control is maintained until the count of blocked calls is zero for a specified number of time windows signaling the end of the call storm.

The present disclosure provides a method and system for automatic triggering network management (NM) control for Voice-Over-IP (VoIP) border elements (BE). In one embodiment, the present disclosure allows monitoring and the prevention of call storms in a communications network, e.g., a VoIP network. More specifically, the present disclosure enables a VoIP network to monitor a calling pattern, such as the number of calls and the call rate within a period of time, and the number of periods with a certain sustained call rate that occurs between the same endpoints. If the number of calls exceed a predetermined threshold, then calls with the same endpoints will be terminated and an alarm notification will be sent, e.g., to a network operator.

Figure 1:
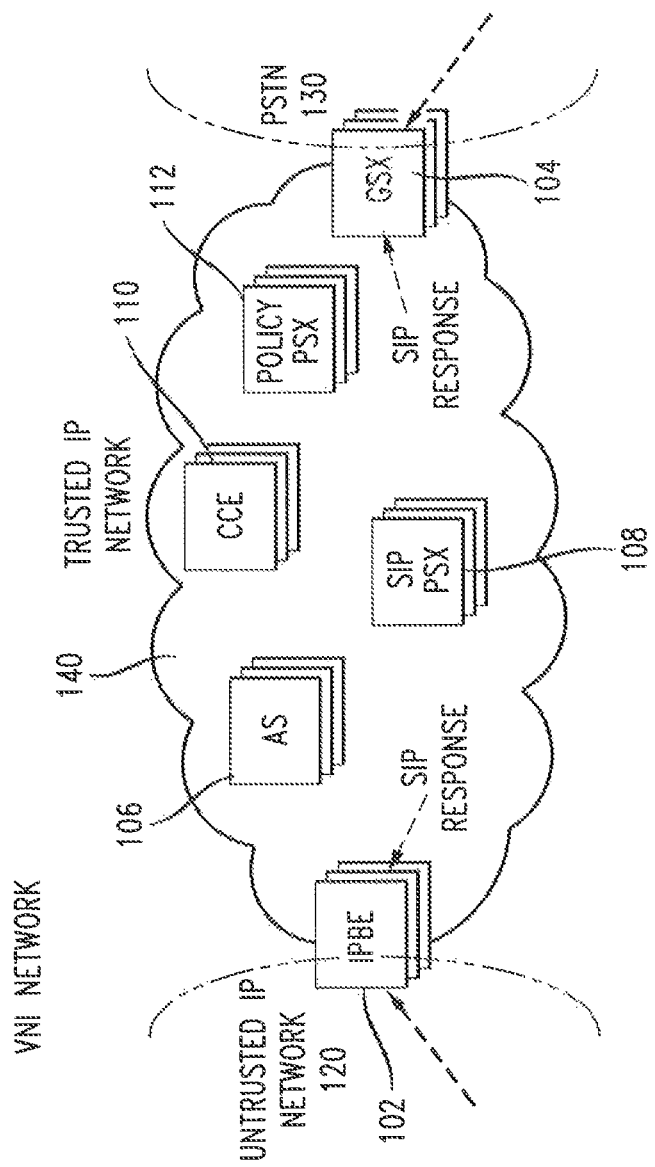
FIG. 1 illustrates an exemplary VNI network, e.g., a network such as a VoIP network, according to an embodiment.

FIG. 1 illustrates an exemplary Virtual Network Infrastructure (VNI) network, e.g., a network such as a Voice-Over-IP (VoIP) network, according to an embodiment. The VoIP network may include various types of middleware and/or hardware elements connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. An IP network is broadly defined as a network that uses Internet Protocol to exchange data packets.

In an embodiment, the exemplary VNI network of FIG. 1 comprises a trusted IP network 140 which interconnects several key VoIP components: at least one Internet Network Border Element (IPBE) 102, at least one Gateway Server Exchange (GSX) 104, at least one Application Server (AS) 106, at least one Session Initiation Protocol-Policy and Routing Server Exchange (SIP-PSX) 108, at least one Call Control Element (CCE) 110, and at least one Policy and Routing Server Exchange (Policy PSX) 112.

The IPBE 102 resides at the edge of the VoIP core infrastructure and interfaces with customers endpoints over various types of access networks. An IPBE 102 is typically implemented as a Media Gateway and performs signaling, media control, security, and call admission control and related functions. The CCE 110 resides within the VoIP infrastructure and is connected to the BEs (including IPBE 102) using the Session Initiation Protocol (SIP) over the underlying Trusted IP network 140. The CCE 110 is typically implemented as a Media Gateway Controller and performs network wide call control related functions as well as interacts with the appropriate VoIP service related servers when necessary. The CCE 110 functions as a SIP back-to-back user agent and is a signaling endpoint for all call legs between IPBE 102 and the CCE 110. In an embodiment, the CCE 110 may need to interact with various VoIP related servers in order to complete a call that requires certain service specific features, e.g. translation of a voice network address into an IP address. The PSXs 108 and 112 reside within the VoIP infrastructure and perform policy and routing functions for the network. The PSXs will typically function as a SIP proxy agent. The AS 106 resides within the VoIP infrastructure and provides enhanced features capabilities for the network. The AS functions as a SIP back-to-back user agent. The GSX 104 resides on the edge of the network and servers as a media and signaling gateway connecting the VNI network with the Public Switched Telephone Network (PSTN) 130.

Telecom network operators rely on traffic management controls to protect their networks during call storm events. Telemarketing campaigns, tele-voting, lotteries, media call-ins, natural disasters, and other events can create intense, often narrowly focused storms that, if not managed, can overwhelm parts of the network. Such events are best managed by limiting storm traffic at the edge of the network.

Although the present disclosure is presented in the context of SIP, it should be understood that the present system and method can be implemented using any signaling protocols. Furthermore, the present system and method can be implemented using signaling protocols that are compliant with various signaling standards or their variants. In an embodiment, it is to be understood that all the logical determination and execution steps within foregoing methods are performed by a processor of a network management control system.

Figure 2:
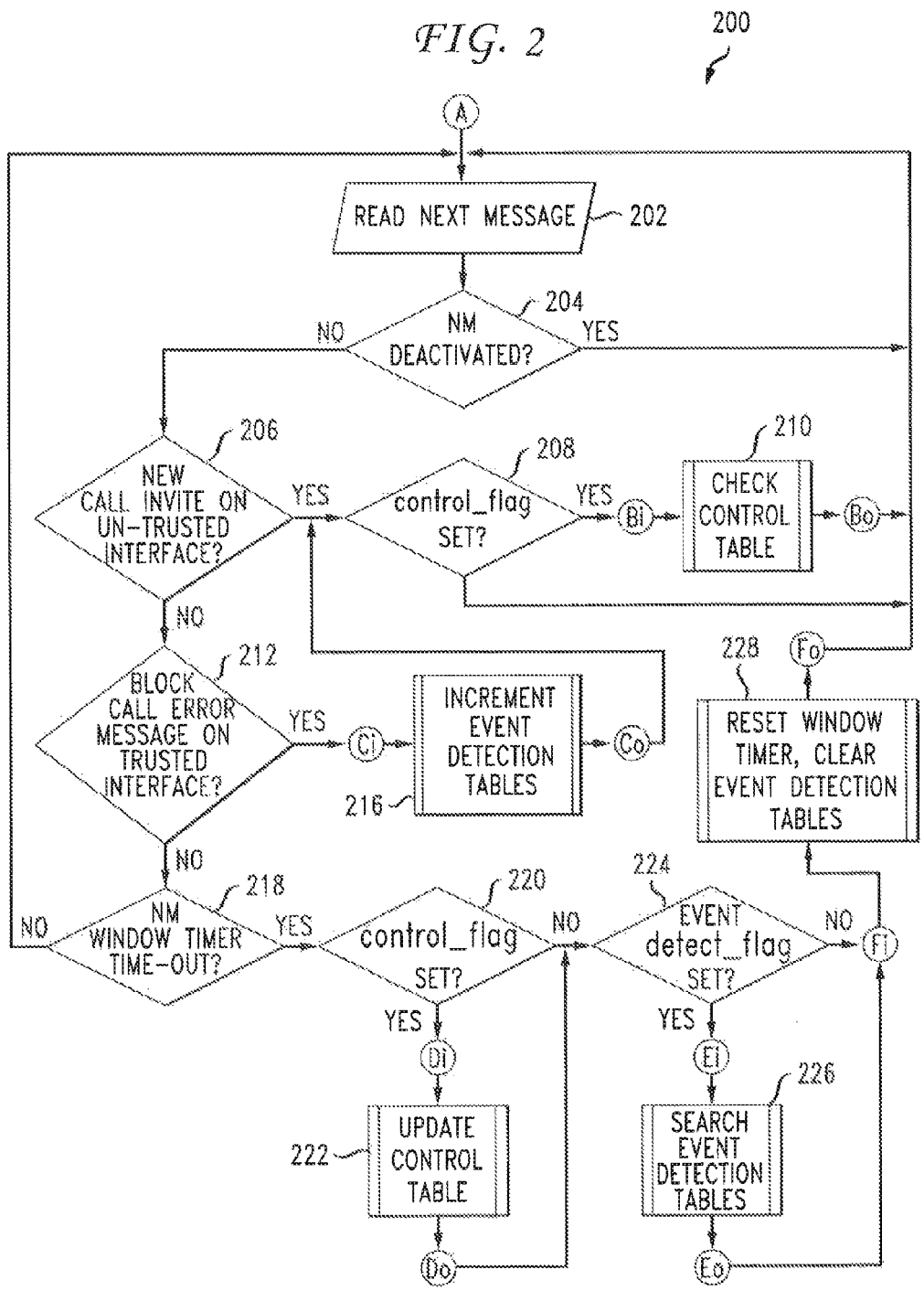
FIG. 2 illustrates a flowchart of a method for monitoring and prevention of call storms according to an embodiment.

FIG. 2 illustrates a flowchart of a method 200 for monitoring and prevention of call storms according to an embodiment. The method 200 runs continuously and starts at step 202 in which a new incoming call is received by a border element such as IPBE 102 of FIG. 1. The method 200 proceeds to step 204 at which a determination is made whether network management (NM) utility is deactivated. This switch allows a network operator to prevent the triggering of automatic NM controls in one or more IPBEs should they have reason to do so. If a determination is made that the NM is deactivated the method 200 returns to step 202 for listening for a new incoming message. Returning to step 204, if a determination is made that the NM is not deactivated, the method 200 proceeds to step 206 at which a determination is made whether the incoming message is a call invite to an un-trusted interface. If a determination is made that the incoming message is a new call invite, the method 200 proceeds to step 208 at which a determination is made whether there are any controls are established. In other words, a determination is made whether the control table is not empty. If a determination is made that the control table is empty, the method 200 returns to step 202 for listening for a new incoming message. If a determination is made that a control table not empty, the method 200 proceeds to step 210 at which controls of the control table are checked and managed.

Figure 3:
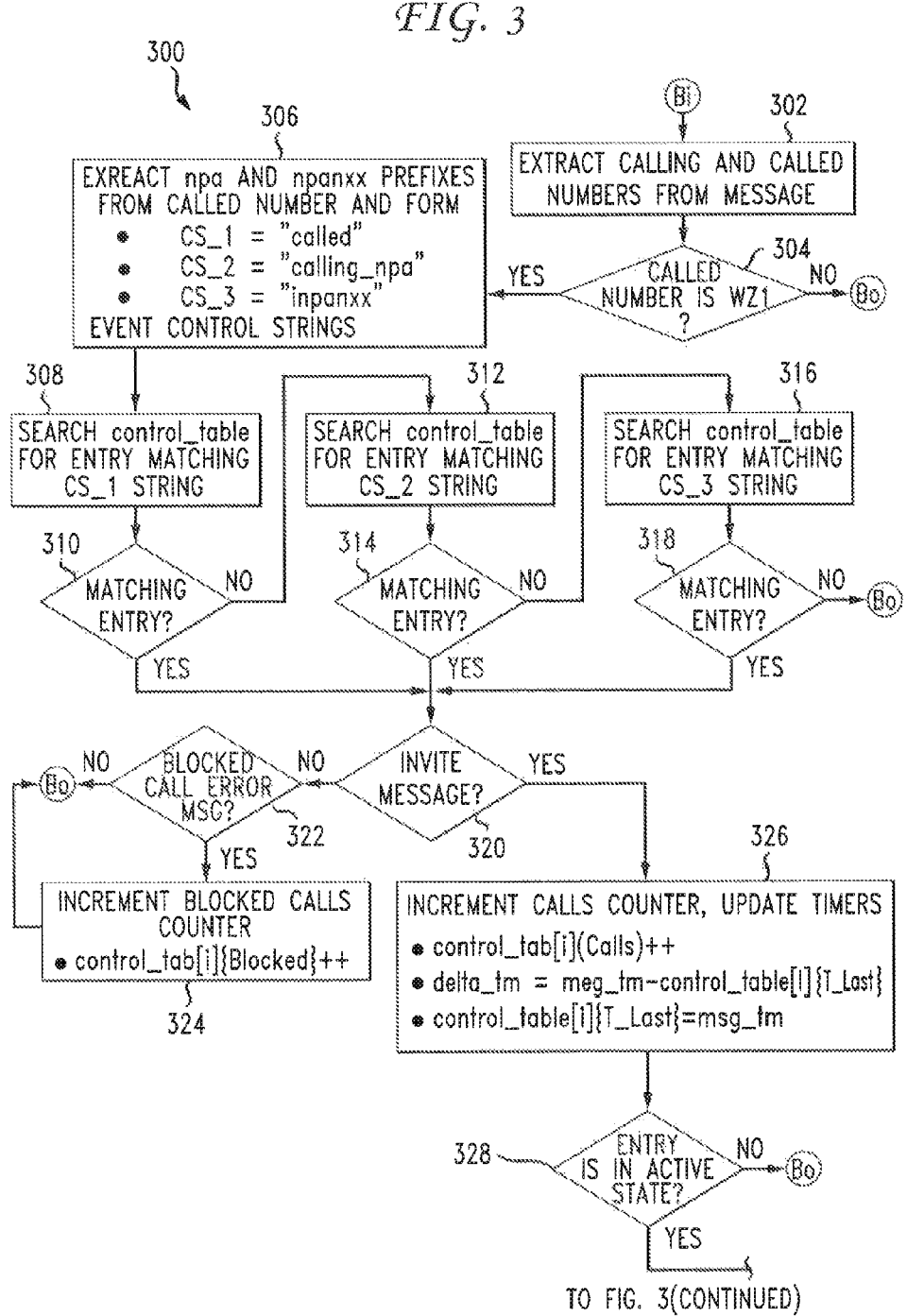
FIG. 3 illustrates an exemplary flowchart of a method for managing the control table according to an embodiment.
Figure 3:
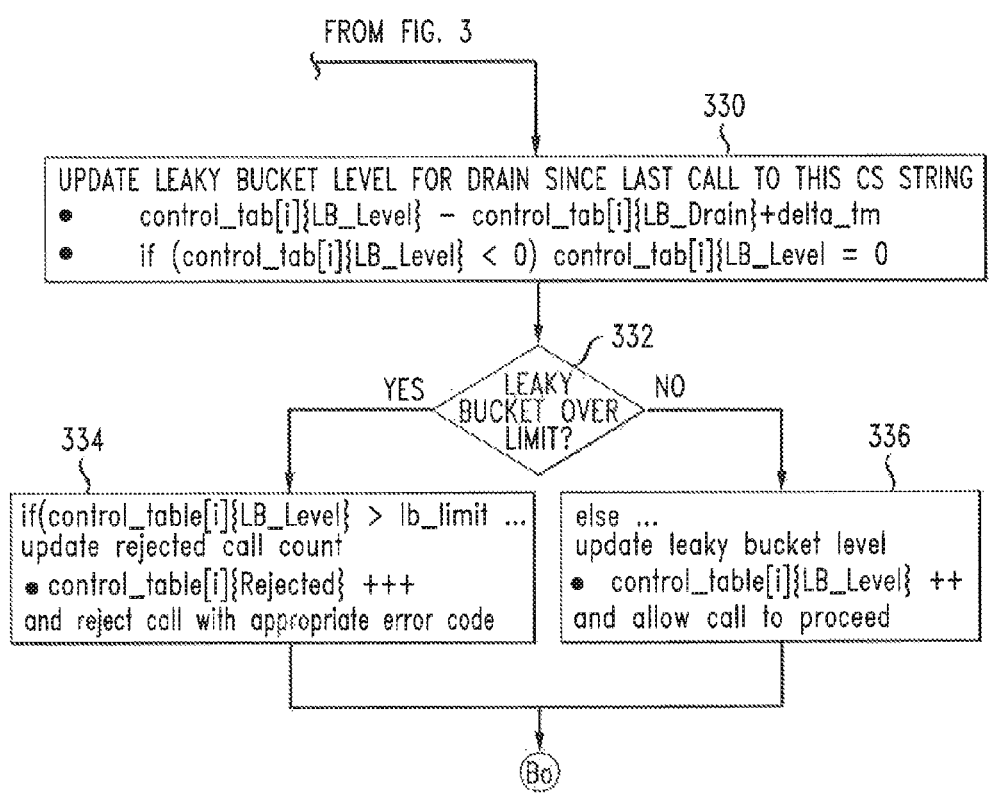

FIG. 3 illustrates an exemplary flowchart of a method 300 for managing the control table according to an embodiment. At step 302, a calling/called numbers are extracted from the incoming message. At step 304, a determination is made whether the extracted number is a North American Numbering Plan World Zone 1 Number (WZ1). It is noted that although the present disclosure is focused on VoIP networks operating primarily within the WZ1 regions, alternative embodiments using, for example, country and city codes for other world regions are possible. If a determination is made that the extracted number is not "WZ1," the method 300 exits and control is returned to the method 200. If a determination is made that extracted number is "WZ1," the method 300 proceeds to step 306 at which control strings (i.e., prefixes "npa" and "npanxx") are extracted from the message. In an embodiment, the control strings have values "called," "calling_npa," and "npanxx" and assigned to variables CS_1, CS_2, and CS_3, respectively.

At step 308, the control table is searched for entries matching the control string CS_1. It is to be understood that the value assigned to the CS_1 string may be in a form of a numerical value (integer), character string, alphanumeric value, hexadecimal value, or a special characters and symbols presented in one or more readable format.

At step 310, a determination is made whether an entry matching the CS_1 control string is located as a result of the search performed at step 308. If there are no entries that match the CS_1 control string in the control table, the method 300 proceeds to step 312 at which the control table is searched for entries matching the values assigned to the control string CS_2. At step 314, a determination is made whether an entry matching the control string CS_2 is located as a result of the search performed at step 312. If there are no entries that match the control string CS_2 in the control table the method 300 proceeds to step 316 at which the control table is searched for entries matching the values assigned to the control string CS_3. At step 318, a determination is made whether an entry matching the control string CS_3 is located as a result of the search performed at step 316. If there are no entries that match the control string CS_3 in the control table the method 300 exits and control is returned to step 202 of method 200 of FIG. 202.

Conversely, if, at steps 310, 314, or 318, a determination is made that there is an entry in the control table that matches any of the CS_1, CS_2, or CS_3 strings, respectively, the method 300 proceeds to step 320 at which a determination is made whether the matching entry is an invite message. If a determination is made that the matching entry is not an invite message, the method 300 proceeds to step 322 at which a determination is made whether the matching entry is a blocked call error message. If a determination is made that the matching entry is not a blocked call error message, the method 300 exits and control is returned to step 202 of method 200 of FIG. 202. If, however, a determination is made that the matching entry is a blocked call error message, the method 300 proceeds to step 324 at which a "blocked calls" counter for this control string is incremented. It is to be understood that the "blocked calls" counter is used to maintain a count of all calls blocked somewhere in the downstream network for this control string and may be implemented, for example, as software.

Returning to step 320, if a determination is made that the entry that matches any of the CS_1, CS_2, or CS_3 strings is an invite message, the method 300 proceeds to step 326 at which a call counter is incremented and network management timers are updated. The call counter is incremented to maintain a count of all incoming calls for this control string. It is to be understood that the call counter and network management timers may be implemented using any suitable computer programming language.

Upon incrementing the call counter and updating network management timers, the method 300 proceeds to step 328 at which a determination is made whether the entry is in active state. If a determination is made that the entry is not in active state, the method 300 exists and control is returned to step 202 of method 200 of FIG. 2. Conversely, if a determination is made that the entry is in active state, the method 300 proceeds to step 330 at which a leaky bucket level is updated since last entry matching an appropriate CS string. The leaky bucket level is maintained to allow the system to admit a specific rate of incoming calls associated with a given control string, while rejecting others so that the allowed rate is not exceeded. These calls may be emanating from a specific source (e.g. a calling number control string), or destined for a specific site or switch (e.g., called number or number prefix), or a combination thereof. If as a result of an update of the leaky bucket level, the current level of leaky bucket becomes less than zero, the value of the current level of leaky bucket is reset to zero.

At step 332, a determination is made whether the leaky bucket value exceeds a predetermined limit. If a determination is made that the leaky bucket value does not exceed a predetermined limit, the method 300 proceeds to step 336 at which the leaky bucket level is updated and the call is allowed to proceed to its destination. If, conversely, a determination is made that the leaky bucket value exceeds a predetermined limit, the method 300 proceeds to step 334 at which the call is rejected with an appropriate error message and the "rejected calls" counter is updated. Steps 334 and 336 conclude the method 300 and control is returned to step 202 of the method 200 of FIG. 2.

Returning to step 206 of FIG. 2, if a determination is made that the incoming message is not a new call invite on an un-trusted interface, the method 200 proceeds to step 212 at which a determination is made whether the message is a blocked call error message is on a trusted interface. If a determination is made that the blocked call error message is on a trusted interface, at step 216 an increment event detection algorithm is invoked.

Figure 4:
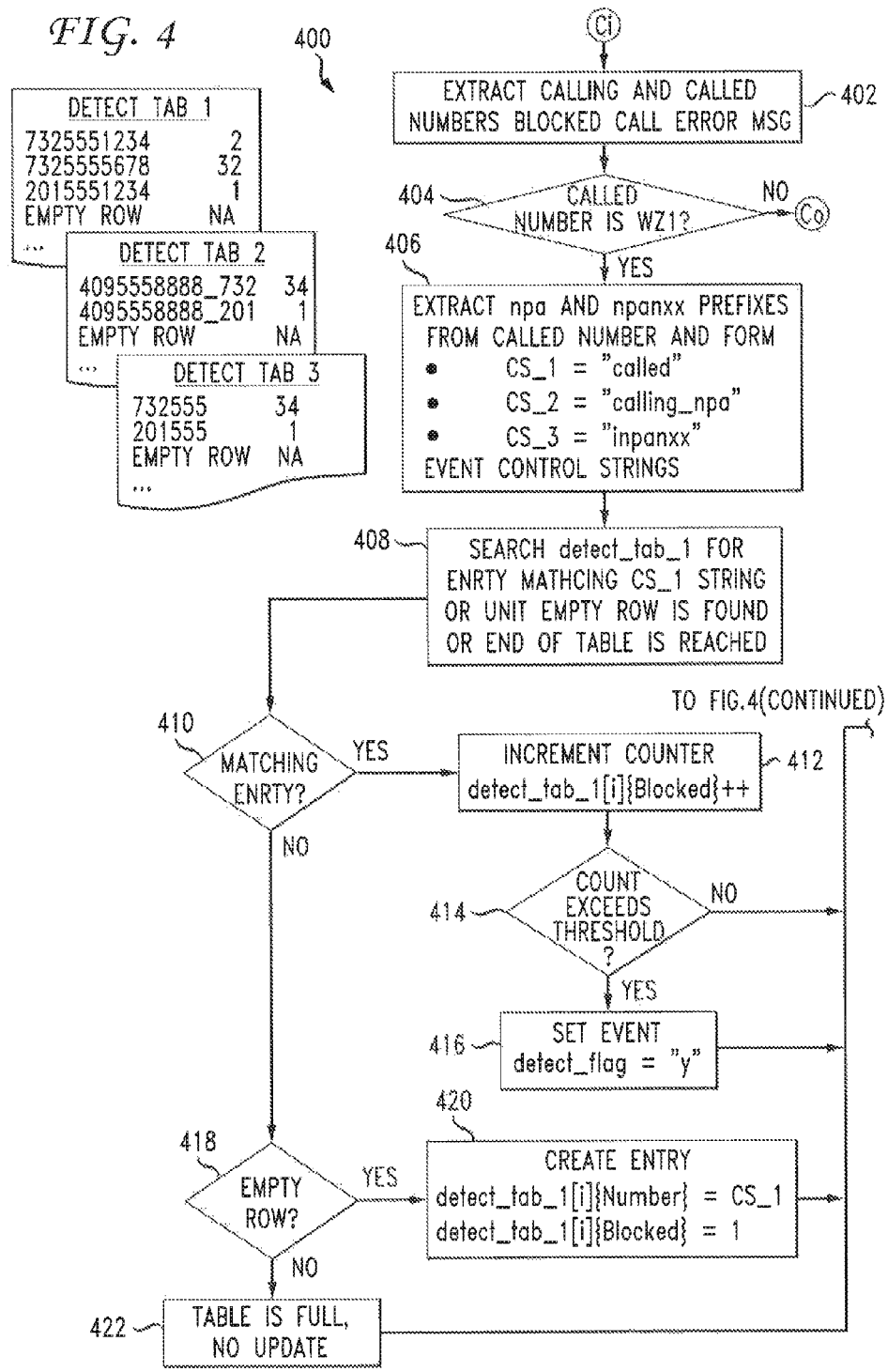
FIG. 4 illustrates an exemplary increment event detection algorithm, according to an embodiment.
Figure 4:
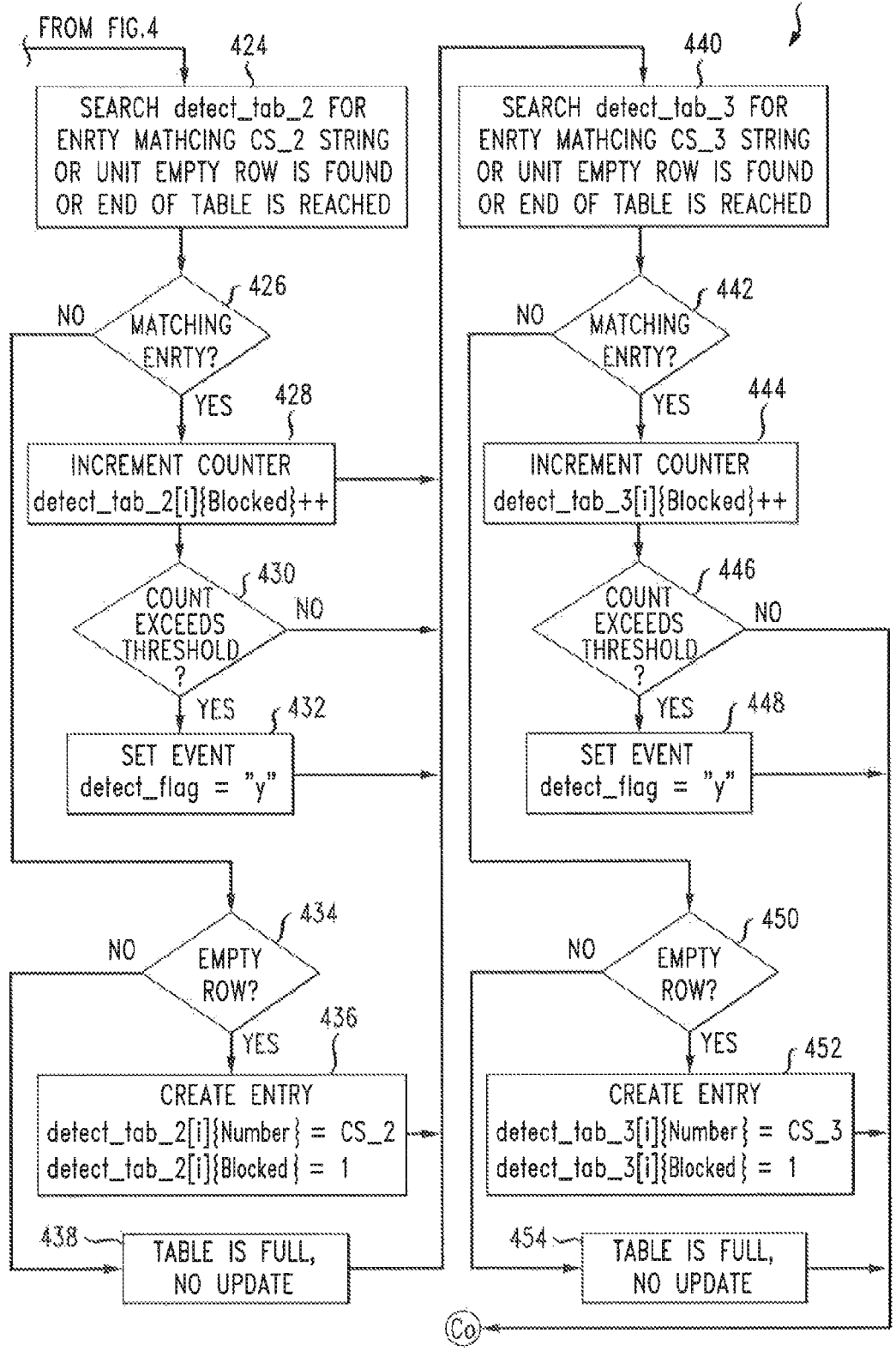

FIG. 4 illustrates an exemplary increment event detection algorithm 400 in according with an embodiment. The increment event detection algorithm 400 can be used to implement step 216 of FIG. 2.

At step 402, a calling/called numbers are extracted from the incoming message. At step 404, a determination is made whether extracted number is "WZ1." If a determination is made that extracted number is not "WZ1," the method 400 exits and control is returned to the method 200. If a determination is made that extracted number is "WZ1," the method 400 proceeds to step 406 at which control strings are extracted from the message. In an embodiment, the control strings have values "called," "calling_npa," and "npanxx" and assigned to variables CS_1, CS_2, and CS_3, respectively.

At step 408, a first control table containing arrays of control strings is searched for a string that matches the CS_1 string. The search for a string that matches the CS_1 string continues until an empty row is located or the end of the table is reached. At step 410, a determination is made whether an entry matching the control string CS_1 is located as a result of the search performed at step 408. If a determination is made that there is an entry that matches the control string CS_1 in the first control table, the method 400 proceeds to step 412 at which a counter for blocked calls is incremented. Specifically, the counter for blocked calls identifies a number of calls containing the control string CS_1 where the calls containing the control string CS_1 are blocked within a given window of time. In an embodiment, blocked calls are normally accompanied by a blocked call error message.

At step 414, a determination is made whether a count of blocked calls calculated at step 412 exceeds a predetermined threshold of blocked calls. If a determination is made that the count of blocked calls does not exceed the predetermined threshold, the method 400 proceeds to step 424 at which a second control table containing arrays of control strings is searched for a string that matches the control string CS_2. The search for a string that matches the control string CS_2 continues until an empty row is located or the end of the table is reached.

Returning to step 414, if a determination is made that the count of blocked calls exceeds the predetermined threshold, at step 416 an event detect flag is set to "YES" and the method 400 proceeds to step 424. The purpose of step 416 is to allow efficient clearing of the event detection tables. If when the NM window timer time-out event occurs, it is determined that the event detect flag is not set to YES, the tables can be safely cleared without having to be searched.

Returning to step 410, if a determination is made that an entry that matches the control string CS_1 does not exist in the first control table, the method 400 proceeds to step 418 at which a determination is made whether the search has reached an empty row of the first control table. If a determination is made that the search has resulted in locating an empty row, a new entry is created. The new entry includes the control string CS_1 and a counter to keep track of a number of blocked calls that include the control string CS_1. Upon creating a new entry, the method 400 proceeds to step 424.

If, at step 418, a determination is made that the search has not located an empty row within the first table, at step 422, the first control table is identified as full and no further update is possible, and the method 400 proceeds to step 424.

At step 424, a second control table containing arrays of control strings is searched for a string that matches the control string CS_2. The search for a string that matches the control string CS_2 continues until an empty row is located or the end of the table is reached. At step 426, a determination is made whether an entry matching the control string CS_2 is located as a result of the search performed at step 424. If a determination is made that there is an entry that matches the control string CS_2 in the second control table, the method 400 proceeds to step 428 at which a counter for blocked calls is incremented. Specifically, the counter for blocked calls identifies a number of calls containing the control string CS_2 and being blocked within a given window of time. In an embodiment, blocked calls are normally accompanied by a blocked call error message.

At step 430, a determination is made whether a count of blocked calls calculated at step 428 exceeds a predetermined threshold of blocked calls. If a determination is made that the count of blocked calls does not exceed the predetermined threshold, the method 400 proceeds to step 440 at which a third control table containing arrays of control strings is searched for a string that matches the control string CS_3. The search for a string that matches the control string CS_3 continues until an empty row is located or the end of the table is reached.

Returning to step 430, if a determination is made that the count of blocked calls exceeds the predetermined threshold, at step 432 a set-event flag is set to "YES" and the method 400 proceeds to step 440.

Returning to step 426, if a determination is made that an entry that matches the control string CS_3 does not exist in the second control table, the method 400 proceeds to step 434 at which a determination is made whether the search has reached an empty row of the second control table. If a determination is made that the search has resulted in locating an empty row, a new entry is created. The new entry includes the control string CS_3 and a counter to keep track of a number of blocked calls that include the control string CS_3. Upon creating a new entry, the method 400 proceeds to step 440.

If, at step 434, a determination is made that the search has not located an empty row within the second table, at step 438, the second control table is identified as full and no further update is possible, and the method 400 proceeds to step 440.

At step 440, a third control table containing arrays of control strings is searched for a string that matches the control string CS_3. The search for a string that matches the control string CS_3 continues until an empty row is located or the end of the third control table is reached. At step 442, a determination is made whether an entry matching the control string CS_3 is located as a result of the search performed at step 440. If a determination is made that there is an entry that matches the control string CS_3 in the third control table, the method 400 proceeds to step 444 at which a counter for blocked calls is incremented and the method 400 proceeds to step 446. Specifically, the counter for blocked calls identifies a number of calls containing the control string CS_3 and being blocked within a given window of time. In an embodiment, blocked calls are normally accompanied by a blocked call error message the control table is searched for entries matching the values assigned to the control string CS_3.

At step 446, a determination is made whether a count of blocked calls calculated at step 428 exceeds a predetermined threshold of blocked calls. If a determination is made that the count of blocked calls does not exceed the predetermined threshold, the method 400 exits and control is returned to step 208 of the method 200 of FIG. 2 as the control table maintains counts of blocked calls for active and pending entries and need to be checked and updated if the control flag is set.

Returning to step 446, if a determination is made that the count of blocked calls exceeds the predetermined threshold, at step 448 a set-event flag is set to "YES" and the method 400 exits and control is returned to step 208 of the method 200 of FIG. 2. The purpose of step 416 is to allow efficient clearing of the event detection tables. If when the NM window timer time-out event occurs, it is determined that the event detect flag is not set to YES, the tables can be safely cleared without having to be searched.

Returning to step 442, if a determination is made that an entry that matches the control string CS_3 does not exist in the third control table, the method 400 proceeds to step 450 at which a determination is made whether the search has reached an empty row of the third control table. If a determination is made that the search has resulted in locating an empty row, a new entry is created. The new entry includes the control string CS_3 and a counter to keep track of a number of blocked calls that include the control string CS_3. Upon creating a new entry, the method 400 the method 400 exits and control is returned to step 208 of the method 200 of FIG. 2.

If, at step 450, a determination is made that the search has not located an empty row within the third table, at step 454, the third control table is identified as full and no further update is possible, and the method 400 the method 400 exits and control is returned to step 208 of the method 200 of FIG. 2.

Returning to step 212 of FIG. 2, if a determination is made that there are no blocked call error messages on trusted network, the method 200 proceeds to step 218 at which a determination is made whether the time window during which the network management control is active has timed-out. If a determination is made that the time window during which the network management control is active has not timed-out, the method 200 returns control to step 202.

If, however, a determination is made that the time window during which the network management control is active has timed-out, the method 200 proceeds to step 220 at which a determination is made whether a control flag is set. This flag indicates whether the control needs to be updated or not which adds to the overall efficiency of the methods. If a determination is made that a control flag is not set, the method 200 proceeds to step 224 at which a determination is made whether the event detection flag has been set. If a determination is made that a control flag is set, the method 200 proceeds to step 222 at which a method for updating a control table is invoked.

Figure 5:
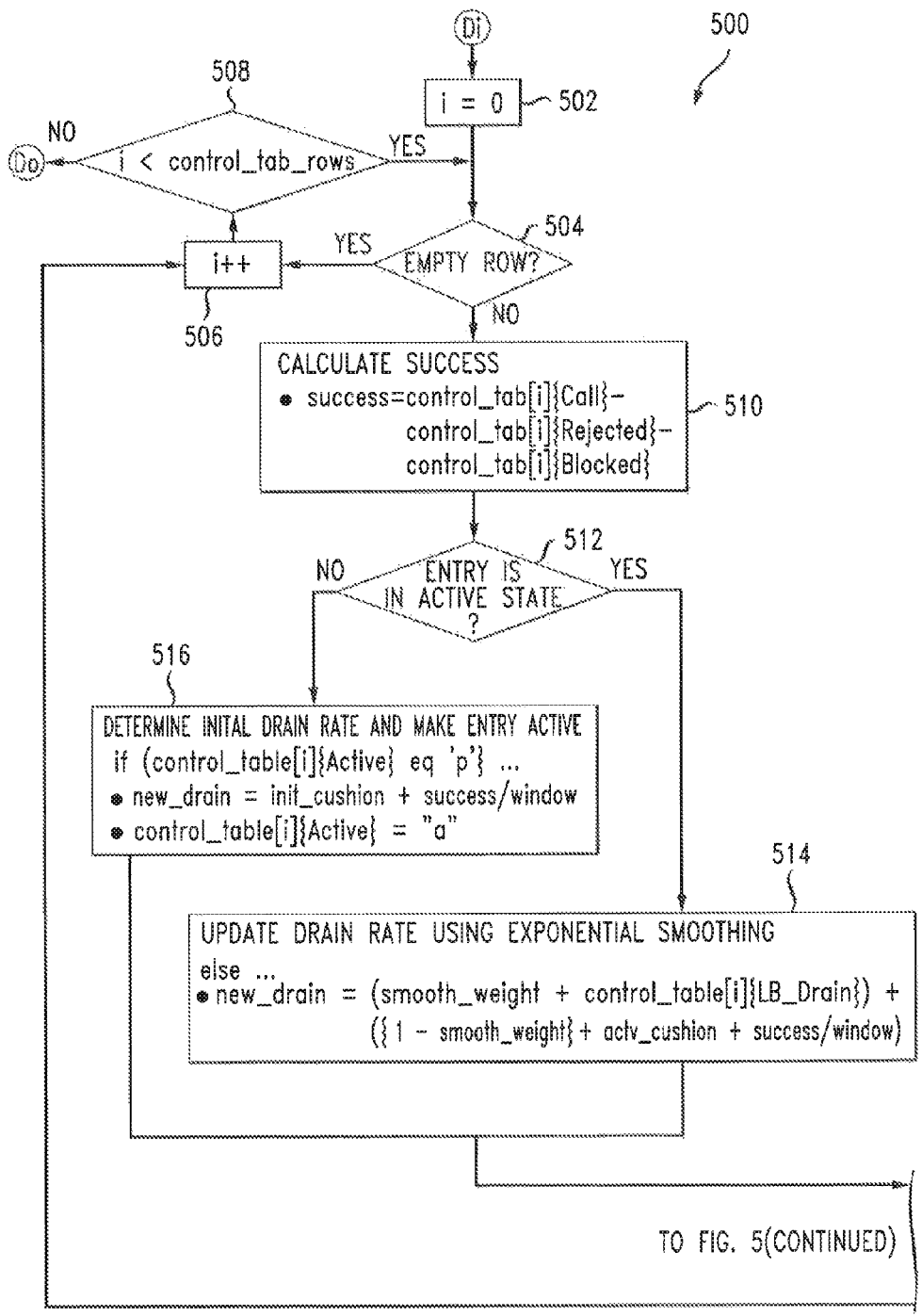
FIG. 5 illustrates a method for updating a control table with respect to a new entry, according to an embodiment.
Figure 5:
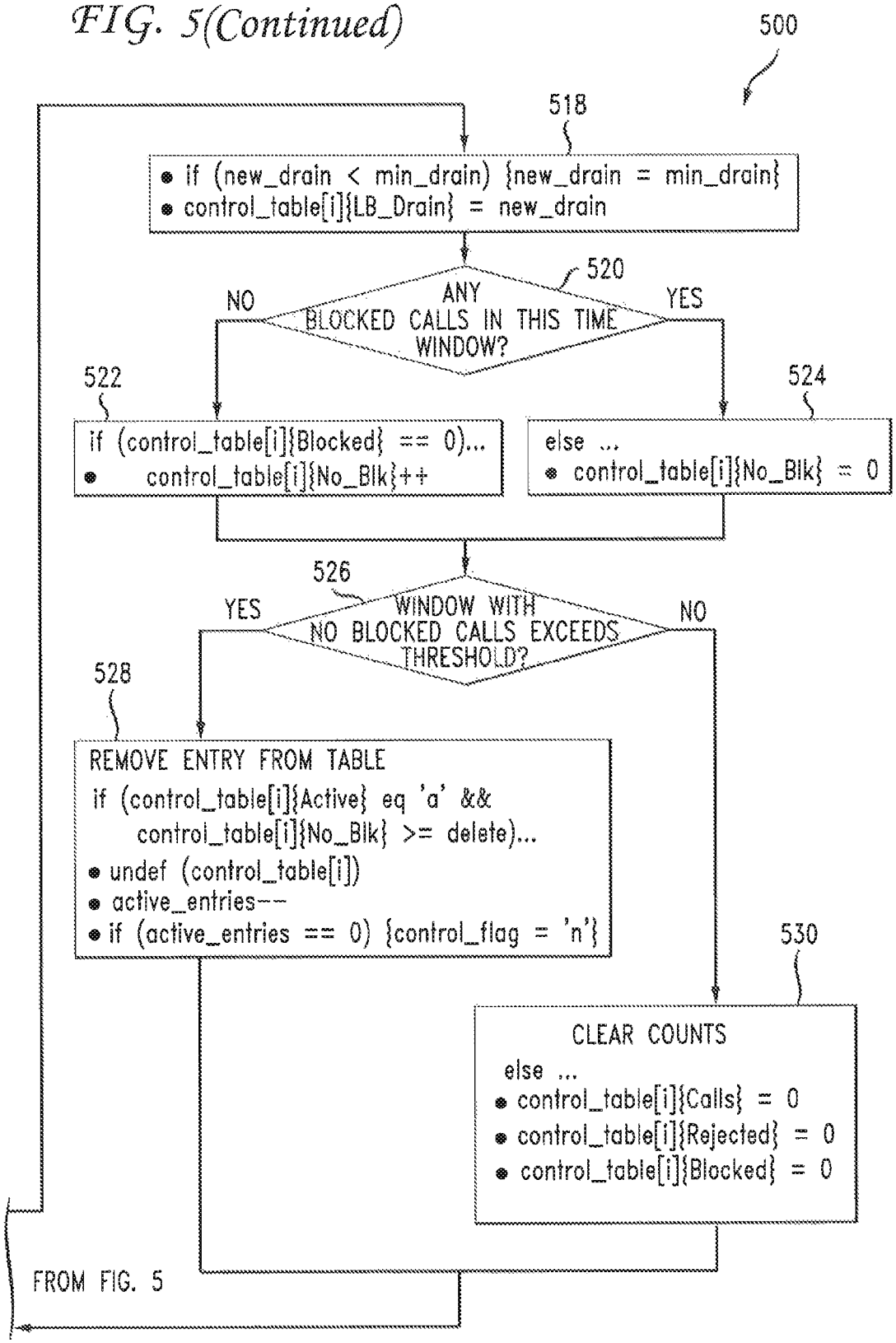

FIG. 5 illustrates a method 500 for updating a control table with respect to existing entries according to an embodiment. The method 500 can be used to implement step 222 of FIG. 2.

At step 502, an update of a control table begins at the first row (the row having a row index value of zero) and the method 500 proceeds to step 504 at which a determination is made whether the first row is an empty row. It is to be understood that the control table update can alternatively begin at any other row. If at step 504 a determination is made that the first row is an empty row, the method 500 proceeds to step 506 at which the method 500 proceeds to a next row of the control table. At step 508, a determination is made whether the next row is the last row of the control table (i.e., the row index value is not mathematically less than a limit of rows of the control table). If a determination is made that the next row is the last row of the control table, the method 500 exits and control is transferred to the method 200.

Conversely, if a determination is made that the next row is not the last row of the control table, the method 500 returns to step 504.

Returning to step 504, if a determination is made that the searched row is not an empty row, the method proceeds to step 510 in which a success rate of propagated calls is calculated by subtracting a number of rejected calls and also subtracting a number of blocked calls from a total number of received calls.

At step 512, a determination is made whether the control entry is the active state. When controls are first added to the table, they are entered in a pending state. This done to allow calculation of an initial leaky bucket drain rate base on the success counter prior to making the control active. If the entry is not in the active state, the method proceeds to step 516 at which an initial drain rate of calls to be allowed through is determined and an identifier changed from pending to active.

Conversely, if a determination is made that the entry is in the active state, the method proceeds to step 514 at which the drain rate of calls to be allowed through is updated using exponential smoothing. In an embodiment, an exponential smoothing factor for drain rate update is set to be 0.67. It is to be understood that the exponential smoothing factor for drain rate update is set to any other suitable value. Subsequent to the processing step 514 or step 516, the method 500 proceeds to step 518 at which the drain rate is updated with a value generated in either step 514 or step 516, depending which of these two steps preceded step 518.

At step 520, a determination is made whether any blocked calls were registered during a given period of time corresponding to the NM control update window. If a determination is made that blocked calls were not registered during a given period of time, a number of consecutive time windows with no blocked calls for the entry is incremented at step 522. The number of consecutive time windows with no blocked calls is used to determine when a given control entry is to be removed from the control table. Conversely, if a determination is made that blocked calls were registered during a given period of time, a number of consecutive time windows with no blocked calls for the entry is reset to be null at step 524.

Subsequent to setting up a number of consecutive time windows with no blocked calls for the entry, the method 500 proceeds to step 526 at which a determination is made whether the number of consecutive time windows with no blocked calls exceeds a predetermined threshold value. If a determination is made that the number of consecutive time windows with no blocked calls does not exceed the predetermined threshold value, at step 530, counters for a number of calls registered, rejected, and blocked for a given entry (i.e., string) in a current time window are cleared and reset to null. If a determination is made that the number of consecutive time windows with no blocked calls does exceeds the predetermined threshold value, at step 528, the entry is removed from the table. Upon completing steps 528 or 530, the method 500 returns to step 506 for a next row of the control table to be updated.

When the entire control table is updated, the method 500 exits and control is returned to the method 200 of FIG. 2.

Returning to FIG. 2, upon conclusion of step 222, the method proceeds to step 224 at which, as noted earlier, a determination is made whether an event detection flag is set. This step allow for more efficient processing. If the flag is not set, there is no need to search the event detection tables since no entry exceeds the predetermined threshold. If a determination is made that the event detection flag is set, the method 200 proceeds to step 226 at which a method for an event search in one or more detection tables is invoked.

Figure 6:
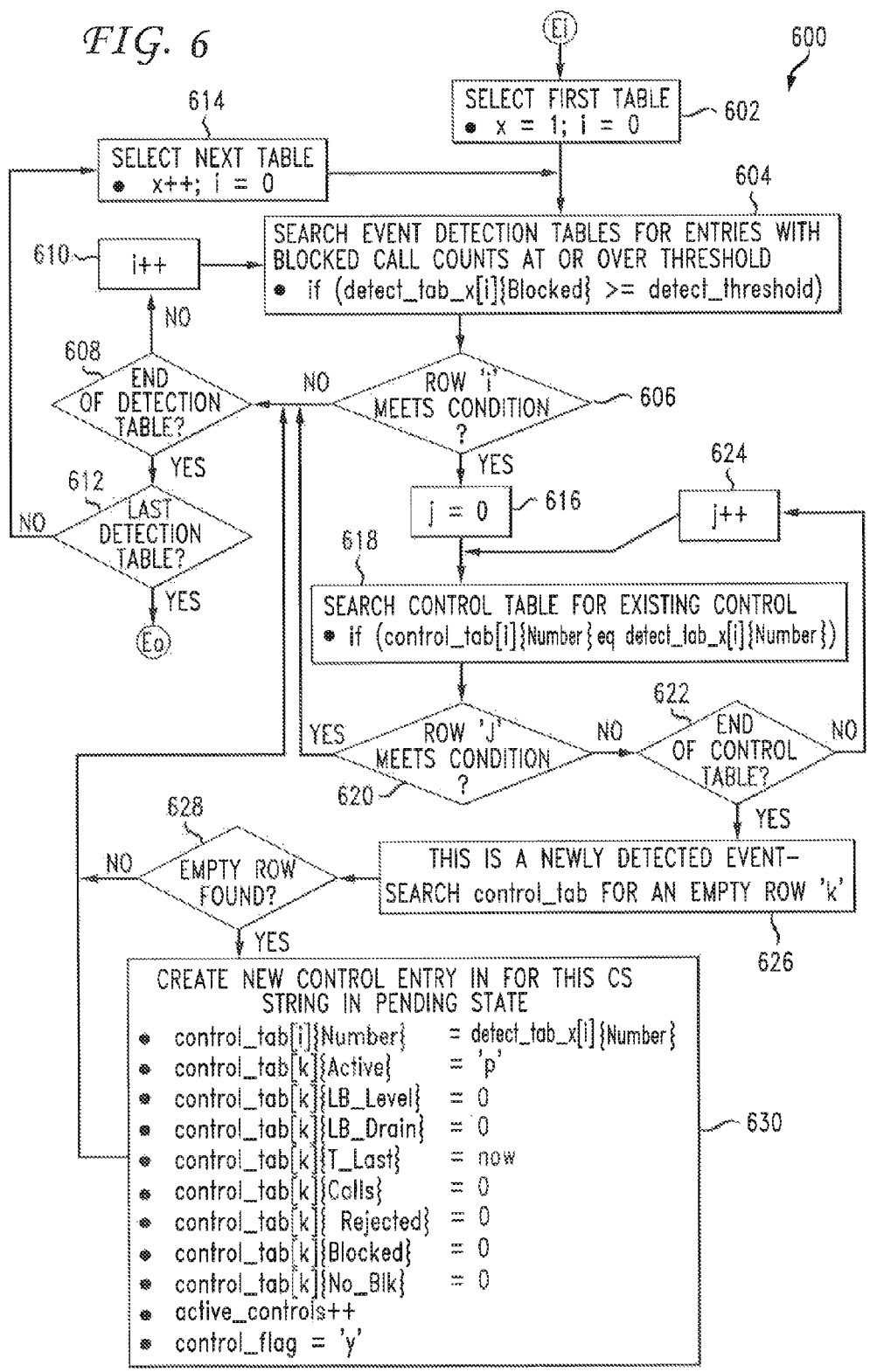
FIG. 6 illustrates a method for an event search in one or more detection tables, according to an embodiment.

FIG. 6 illustrates a method 600 for an event search in one or more detection tables in according to an embodiment. The method 600 can be used to implement step 226 of FIG. 2.

At step 602, a first row of a first event detection table is selected according to an embodiment. At step 604, the first row of the event detection table is searched for entries with a number of blocked calls at or exceeding a predetermined threshold value.

At step 606, a determination is made whether the first searched row meets the condition; i.e. the count exceeds the threshold. If a determination is made that the first searched row does not meet the condition, the process 600 proceeds to step 608 at which a determination is made whether the search has reached the end of the detection table. If the determination is made that the search has not reached the end of the detection table, the search proceeds to a next row of the event detection table and the method 600 returns to step 604 at which the next row of the event detection tables is searched for entries with a number of blocked calls at or exceeding a predetermined threshold value.

If a determination is made that the search has reached the end of the determination table, the method 600 proceeds to step 612 at which a determination is made whether the search was conducted within a last detection table. If a determination is made that the search was conducted within the last detection table, the method 600 exits and control is returned to the method 200 of FIG. 2.

If, however, a determination is made that the search was not made within the last detection table, the method 600 proceeds to step 614 at which a next control table is selected for a search and the method 600 returns to step 604 at which a first row of the next event detection table is searched for entries with a number of blocked calls at or exceeding a predetermined threshold value.

Returning to step 606, if a determination is made that the first searched row meets the condition, the process 600 proceeds to step 616 at which a row of a control table is selected according to an embodiment. At step 618, the control table is searched for an existing control. At step 620, a determination is made whether the searched row of the control table meets the condition; i.e. that a control already exists for this control string. If a determination is made that the searched row of the control table meets the condition, the method 600 returns to step 608.

If a determination is made that the searched row of the control table does not meet the predetermined condition, the method 600 proceeds to step 622 at which a determination is made whether the search has reached the end of the control table. If a determination is made that the search has not reached the end of the control table, at step 624 the search is propagated to a next row of the control table and the method 600 proceeds to step 618 at which a new row of the next control table is searched for the existing control. If a determination is made that the search has reached the end of the control table, the method 600 proceeds to step 626 at which the string is identified as a newly detected event and an instruction to search for the control table for an empty row is generated.

Subsequent to step 626, at step 628, a determination is made whether an empty row has been located. If a determination is made that an empty row has not been located in the control table, the method 600 returns to step 608. Conversely, if a determination is made that an empty row has been located in the control table, the method 600 proceeds to step 630 at which a new control entry is created in a pending state for a string in question. Upon creating the new control entry for the string in question, the method returns to step 608.

Returning to FIG. 2, upon completing step 226, the method 200 proceeds to step 228 at which a value for a time window timer is reset and values for all event detection tables are cleared. Finally, the method 200 returns control to step 202.

Figure 7:
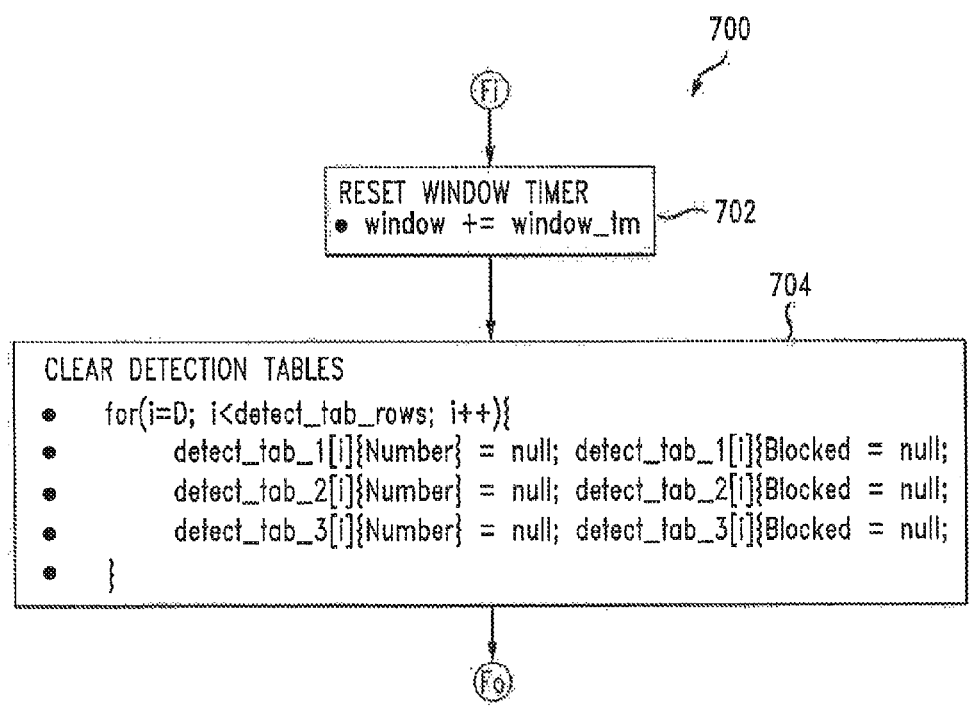
FIG. 7 illustrates a method for resetting and/or clearing of the value for the time window timer and values for all event detection tables, according to an embodiment.

FIG. 7 illustrates a method 700 for resetting and/or clearing of the value for the time window timer and values for all event detection tables. The method 700 can be used to implement step 228 of FIG. 2.

At step 702, a time window timer is reset and, at step 704, values for detection tables are reset to null.

Table 1 and Table 2 illustrate, respectively, exemplary 10- and 6-digit control tables. In an embodiment, a predetermined threshold of 10 calls is set for a maximum number of calls allowed within a predetermined time window without a control string being added to the control table. A predetermined time window is set to be 10 seconds.

TABLE 2

6 Digit Table

| NPA-NXX | Count |
| --- | --- |
| 304550 | 47 |
| 304633 | 1 |
| 304633 | 2 |
| 304546 | 1 |
| 304654 | 6 |
| 304644 | 1 |

TABLE 1

10 Digit Table

| Number | Count |
| --- | --- |
| 304550num1 | 47 |
| 304633num1 | 1 |
| 304633num2 | 1 |
| 304546num1 | 1 |
| 304654num2 | 1 |
| 304644num3 | 1 |

Table 1 illustrates a 10-digit control table which includes the "number" column to store control strings retrieved from an incoming message and the "count" column to store a count of control strings retrieved from the incoming message. With the call count threshold being set to 10 calls, the "304550num1" string exceeds the threshold and is added to control list.

Table 2 illustrates a 6-digit control table which includes the "number" column to store control strings retrieved from an incoming message and the "count" column to store a count of control strings retrieved from the incoming message. With the call count threshold being set to 10 calls, the "304550" string exceeds the threshold and is added to control list.

Figure 8:
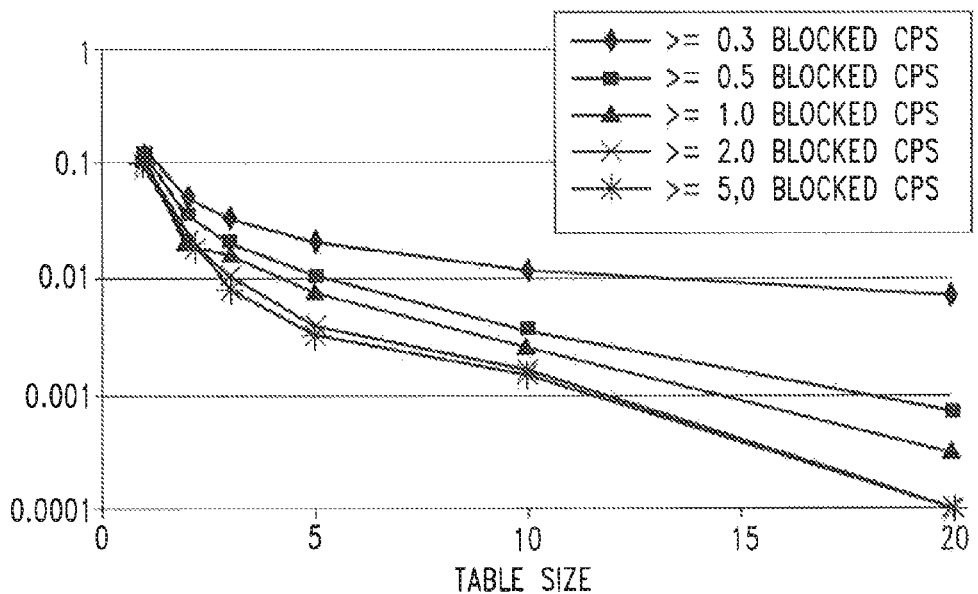
FIG. 8 illustrates an exemplary diagram showing dependence of a probability of missing a high volume number with a 10-digit control table having a small size, according to an embodiment.

FIG. 8 illustrates an exemplary diagram showing a probability of missing a high volume number as a function of the size of a 10-digit control table. Similarly to the 6-digit control table, for the 10-digit control table, having a control table with less than 5 rows, the probability of having calls being rejected is substantially above 10 percent. The probability decreases exponentially with an increase of the rows, such that the probability of missing a high volume number for the control table having 10 rows does not exceed 0.1 percent while the control table having 20 rows does not exceed 0.01 percent.

Figure 9:
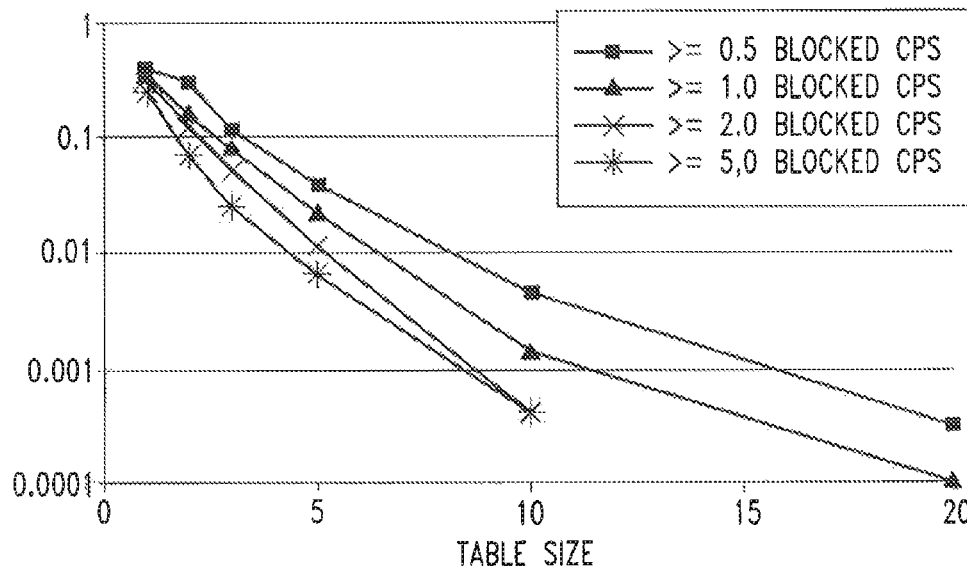
FIG. 9 illustrates an exemplary diagram showing dependence of a probability of missing a high volume number with a 6-digit control table having a small size, according to an embodiment.

FIG. 9 illustrates an exemplary diagram showing a probability of missing a high volume number as a function of the size of a 6-digit control table. As depicted, having a control table with less than 5 rows, the probability of having calls being rejected is above 10 percent. The probability decreases exponentially with an increase of the rows, such that the probability of missing a high volume number for the control table having 20 rows does not exceed 1 percent.

Figure 11A:
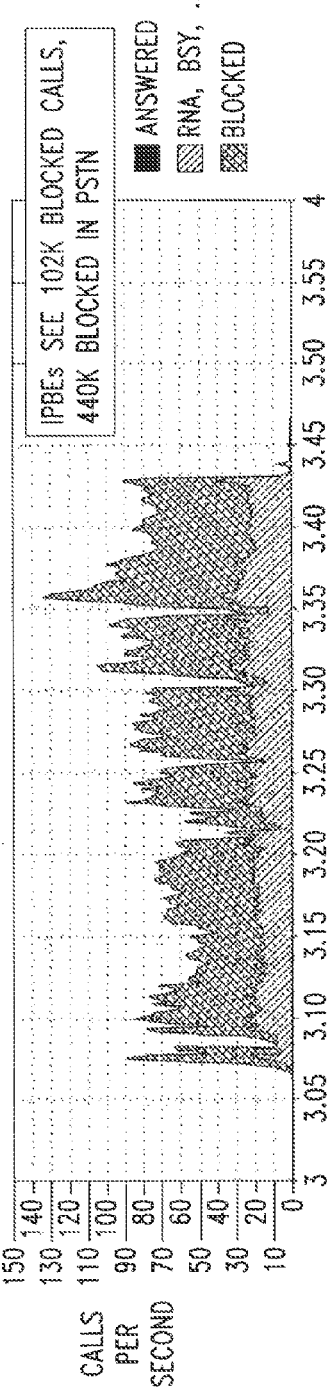
Figure 11B:
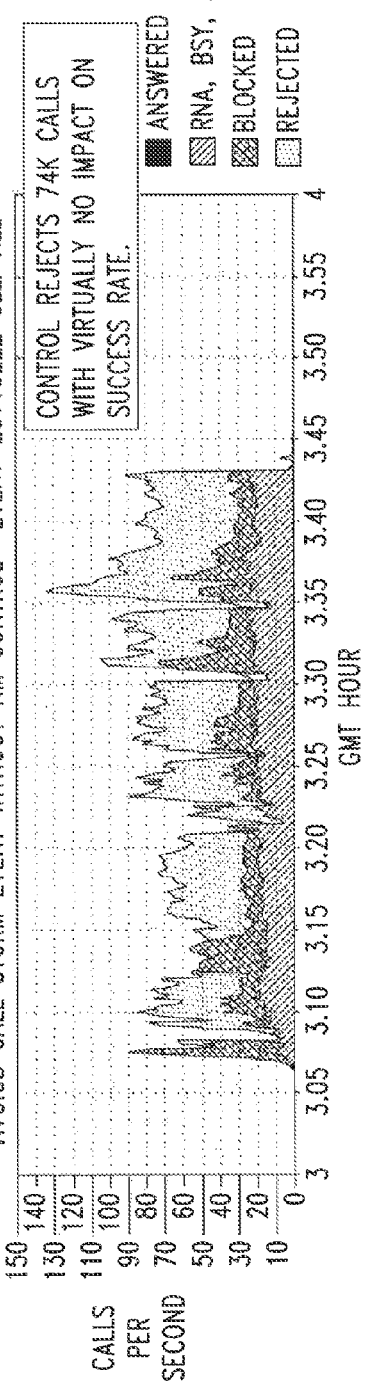
Figure 12A:
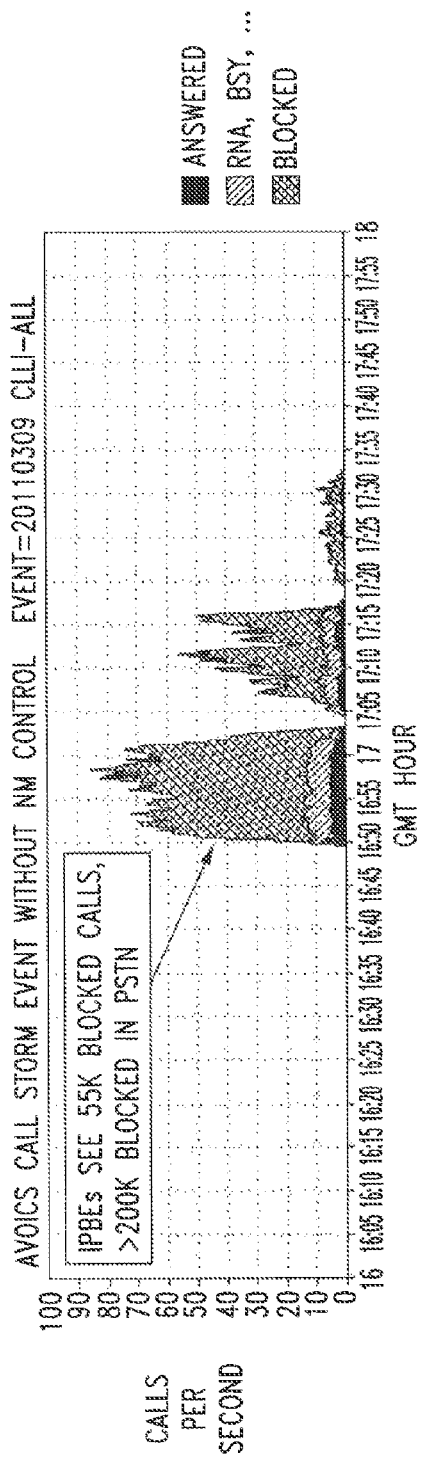
Figure 12B:
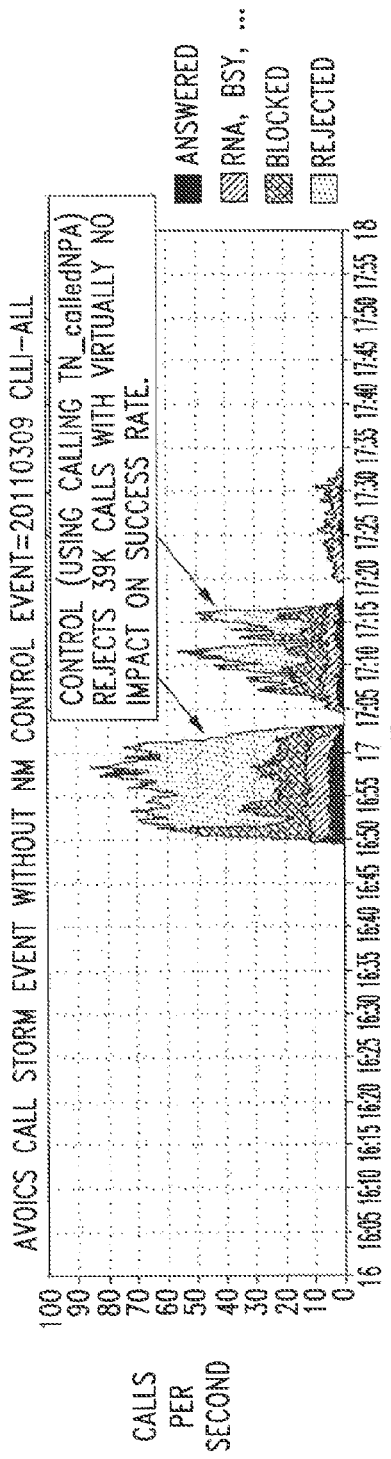

FIGS. 10-12 illustrate a playback of the events recorded on selected dates in accordance with an embodiment. FIGS. 10(A), 11(A), and 12(A) depict actual results without the network management control being implemented. Specifically, FIG. 10(A) illustrates the BE(s) admitted over 100,000 calls that were eventually blocked in the downstream network. These blocked calls expanded to 450,000 calls attempts due to network initiated retries that were blocked by other components of the system without the network management control being implemented. Similarly, FIG. 11(A) illustrates BE(s) admitting approximately 11,000 calls which resulted in 40,000 calls attempts being blocked by other components of the system without the network management control being implemented. Also, FIG. 12(A) illustrates the BE(s) admitting approximately 55,000 calls which resulted in over 200,000 calls attempts being blocked by other components of the system without the network management control being implemented. Conversely, FIGS. 10(B), 11(B), and 12(B) depict actual results when the network management control is implemented and active on border elements of the VoIP network. Specifically, FIG. 10(B) illustrates the BE rejecting approximately 74,000 calls with virtually no impact on the success rate of allowed calls and without any impact of the rest of the system when the network management control is implemented. Similarly, FIG. 11(B) illustrates the BE rejecting approximately 5,500 calls with virtually no impact on the success rate of allowed calls and without any impact of the rest of the system when the network management control is implemented. Also, FIG. 12(B) illustrates the BE rejecting approximately 39,000 calls with virtually no impact on the success rate of allowed calls and without any impact of the rest of the system when the network management control is implemented.

It should be noted that the present disclosure can be implemented in software and/or in a combination of software and hardware, e.g., using application specific integrated circuits (ASIC), a general purpose computer or any other hardware equivalents. In one embodiment, the present call setup message monitoring module can be loaded into memory and executed by processor to implement the functions as discussed above. As such, the present single number to multiple devices process (including associated data structures) of the present disclosure can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

One skilled in the art will recognize that the system configuration of FIGS. 1-7 are non-limiting and that components of the presented system may be combined in any way in various embodiments and may include any additional and/or desired components and/or configurations.

FIG. 13 is a high-level block diagram of an exemplary computer that may be used for a method and system for automatic triggering network management (NM) control for Voice-Over-IP (VoIP) border elements (BE). Computer 1300 comprises a processor 1301 operatively coupled to a data storage device 1302 and a memory 1303. Processor 1301 controls the overall operation of computer 1300 by executing computer program instructions that define such operations.

The computer program instructions may be stored in data storage device 1302, or other computer readable medium, and loaded into memory 1303 when execution of the computer program instructions is desired. Thus, the steps of FIGS. 2-7 can be defined by the computer program instructions stored in memory 1303 and/or data storage device 1302 and controlled by processor 1301 executing the computer program instructions. For example, the computer program instructions can be implemented as computer executable code programmed by one skilled in the art to perform an algorithm defined by the method steps of FIGS. 2-7. Accordingly, by executing the computer program instructions, the processor 1301 executes an algorithm defined by the method steps of FIGS. 2-7. Computer 1300 also includes one or more network interfaces 1305 for communicating with other devices via a network. Computer 1300 also includes one or more input/output devices 1304 that enable user interaction with computer 1300 (e.g., display, keyboard, mouse, speakers, buttons, etc.).

Processor 1301 may include both general and special purpose microprocessors, and may be the sole processor or one of multiple processors of computer 1300. Processor 1301 may comprise one or more central processing units (CPUs), for example. Processor 1301, data storage device 1302, and/or memory 1303 may include, be supplemented by, or incorporated in, one or more application-specific integrated circuits (ASICs) and/or one or more field programmable gate arrays (FPGAs).

Data storage device 1302 and memory 1303 each comprise a tangible non-transitory computer readable storage medium. Data storage device 1302, and memory 1303, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1305 may include peripherals, such as a printer, scanner, display screen, etc. For example, input/output devices 1304 may include a display device such as a cathode ray tube (CRT), plasma or liquid crystal display (LCD) monitor for displaying information to the user, a keyboard, and a pointing device such as a mouse or a trackball by which the user can provide input to computer 1300.

One skilled in the art will recognize that an implementation of an actual computer or computer system may have other structures and may contain other components as well, and that FIG. 13 is a high level representation of some of the components of such a computer for illustrative purposes.

The foregoing Detailed Description is to be understood as being in every respect illustrative and exemplary, but not restrictive, and the scope of the disclosure disclosed herein is not to be determined from the Detailed Description, but rather from the claims as interpreted according to the full breadth permitted by the patent laws. It is to be understood that the embodiments shown and described herein are only illustrative of the principles of the present disclosure and that various modifications may be implemented by those skilled in the art without departing from the scope and spirit of the disclosure.

Those skilled in the art could implement various other feature combinations without departing from the scope and spirit of the disclosure.

The invention claimed is:

1. A method, the method comprising:
   in response to determining that a message received by a network interface is a new invite call from an un-trusted network and that a control table is not null:
      extracting a control string from the new invite call and searching the control table for an entry that matches the control string;
      in response to identifying the entry that matches the control string:
         updating a call counter;
         updating a leaky bucket level;
         determining whether the leaky bucket level exceeds a threshold; and
         in response to determining that the leaky bucket level exceeds the threshold, rejecting the new invite call and updating a counter of rejected calls;
   monitoring a network control timer; and
   in response to determining that a value of the network control timer exceeds a predetermined time limit and that the control table is not null:
      calculating a success rate for the control string, wherein calculating the success rate comprises:
         subtracting a number of blocked calls and a number of rejected calls from a total number of calls;
      in response to determining that a network management control is in an active state, updating a drain rate using an exponential smoothing;
      in response to determining that a blocked call was received within the predetermined time limit, updating a blocked call counter of the control table; and
      in response to determining that a count of consecutive control windows with no blocked calls exceeds a second threshold, deleting an entry from the control table.

2. The method of claim 1, further comprising:
   in response to determining that the leaky bucket level does not exceed the threshold, allowing the new invite call and updating the leaky bucket level.

3. The method of claim 1, further comprising:
   in response to determining that the message is a blocked call error message on a trusted network:
      extracting a control string from the blocked call error message and searching a detect table for an entry that matches the control string from the blocked call error message;
      in response to identifying the entry that matches the control string from the blocked call error message:
         updating a blocked call counter; and
         setting a control flag in response to determining that a value of the blocked call counter exceeds a third threshold.

4. The method of claim 1, wherein the drain rate equals a success rate multiplied by a safety margin value.

5. The method of claim 1, wherein an initial drain rate is set when the network management control is not in the active state.

6. The method of claim 1, further comprising:
   switching the network management control between an inactive state and the active state by an administrative command.

7. The method of claim 1, wherein a network interface maintains a count of control strings.

8. An apparatus comprising:
a processor; and
a memory to store computer program instructions which, when executed on the processor, cause the processor to perform operations comprising:
in response to determining that a message received by a network interface is a new invite call from an un-trusted network and that a control table is not null:
extracting a control string from the new invite call and searching the control table for an entry that matches the control string;
in response to identifying the entry that matches the control string:
updating a call counter;
updating a leaky bucket level;
determining whether the leaky bucket level exceeds a threshold; and
in response to determining that the leaky bucket level exceeds the threshold, rejecting the new invite call and updating a counter of rejected calls;
monitoring a network control timer; and
in response to determining that a value of the network control timer exceeds a predetermined time limit and that the control table is not null:
calculating a success rate for the control string, wherein calculating the success rate comprises:
subtracting a number of blocked calls and a number of rejected calls from a total number of calls;
in response to determining that a network management control is in an active state, updating a drain rate using an exponential smoothing;
in response to determining that a blocked call was received within the predetermined time limit, updating a blocked call counter of the control table; and
in response to determining that a count of consecutive control windows with no blocked calls exceeds a second threshold, deleting an entry from the control table.

9. The apparatus of claim 8, the operations further comprising:
in response to determining that the leaky bucket level does not exceed the threshold, allowing the new invite call and updating the leaky bucket level.

10. The apparatus of claim 8, the operations further comprising:
in response to determining that the message is a blocked call error message on a trusted network:
extracting a control string from the blocked call error message and searching a detect table for an entry that matches the control string from the blocked call error message;
in response to identifying the entry that matches the control string from the blocked call error message:
updating a blocked call counter; and
setting a control flag in response to determining that a value of the blocked call counter exceeds a third threshold.

11. The apparatus of claim 8, wherein the drain rate equals a success rate multiplied by a safety margin value.

12. The apparatus of claim 8, wherein an initial drain rate is set when the network management control is not in the active state.

13. The apparatus of claim 8, the operations further comprising:
switching the network management control between an inactive state and the active state by an administrative command.

14. The apparatus of claim 8, wherein a network interface maintains a count of control strings.

15. A non-transitory computer readable medium storing computer program instructions which, when executed on a processor, cause the processor to perform operations comprising:
in response to determining that a message received by a network interface is a new invite call from an un-trusted network and that a control table is not null:
extracting a control string from the new invite call and searching the control table for an entry that matches the control string;
in response to identifying the entry that matches the control string:
updating a call counter;
updating a leaky bucket level;
determining whether the leaky bucket level exceeds a threshold; and
in response to determining that the leaky bucket level exceeds the threshold, rejecting the new invite call and updating a counter of rejected calls;
monitoring a network control timer; and
in response to determining that a value of the network control timer exceeds a predetermined time limit and that the control table is not null:
calculating a success rate for the control string, wherein calculating the success rate comprises:
subtracting a number of blocked calls and a number of rejected calls from a total number of calls;
in response to determining that a network management control is in an active state, updating a drain rate using an exponential smoothing;
in response to determining that a blocked call was received within the predetermined time limit, updating a blocked call counter of the control table; and
in response to determining that a count of consecutive control windows with no blocked calls exceeds a second threshold, deleting an entry from the control table.

16. The non-transitory computer readable medium of claim 15, the operations further comprising:
in response to determining that the leaky bucket level does not exceed the threshold, allowing the new invite call and updating the leaky bucket level.

17. The non-transitory computer readable medium of claim 15, the operations further comprising:
in response to determining that the message is a blocked call error message on a trusted network:
extracting a control string from the blocked call error message and searching a detect table for an entry that matches the control string from the blocked call error message;
in response to identifying the entry that matches the control string from the blocked call error message:
updating a blocked call counter; and
setting a control flag in response to determining that a value of the blocked call counter exceeds a third threshold.

18. The non-transitory computer readable medium of claim 15, wherein the drain rate equals a success rate multiplied by a safety margin value.

19. The non-transitory computer readable medium of claim 15, wherein an initial drain rate is set when the network management control is not in the active state.

20. The non-transitory computer readable medium of claim 15, the operations further comprising:
    switching the network management control between an inactive state and the active state by an administrative command.

* * * * *